United States Patent
Chen et al.

(10) Patent No.: US 10,824,752 B2
(45) Date of Patent: Nov. 3, 2020

(54) UTILIZING HEURISTIC AND MACHINE LEARNING MODELS TO GENERATE A MANDATORY ACCESS CONTROL POLICY FOR AN APPLICATION

(71) Applicant: Accenture Global Solutions Limited, Dublin (IE)

(72) Inventors: Chien An Chen, Fairfax, VA (US); Azzedine Benameur, Fairfax, VA (US); Lei Ding, North Potomac, MD (US)

(73) Assignee: Accenture Global Solutions Limited, Dublin (IE)

( * ) Notice: Subject to any disclaimer, the term of this patent is extended or adjusted under 35 U.S.C. 154(b) by 240 days.

(21) Appl. No.: 16/162,114

(22) Filed: Oct. 16, 2018

(65) Prior Publication Data

US 2020/0117817 A1    Apr. 16, 2020

(51) Int. Cl.
*G06F 21/62* (2013.01)
*G06N 20/00* (2019.01)
(Continued)

(52) U.S. Cl.
CPC .......... *G06F 21/6218* (2013.01); *G06F 16/10* (2019.01); *G06F 21/604* (2013.01); *G06N 5/003* (2013.01); *G06N 20/00* (2019.01); *H04L 63/105* (2013.01); *H04L 63/20* (2013.01); *G06F 2221/2113* (2013.01); *G06F 2221/2141* (2013.01)

(58) Field of Classification Search
CPC .................................................. G06F 21/6218
USPC .......................................................... 726/27
See application file for complete search history.

(56) References Cited

U.S. PATENT DOCUMENTS

2004/0158817 A1* 8/2004 Okachi ................ G06F 8/65
                                                          717/122
2009/0044024 A1  2/2009 Oberheide et al.
(Continued)

FOREIGN PATENT DOCUMENTS

JP        2019028689 A  *  2/2019

OTHER PUBLICATIONS

Rad et al., Secure Image Processing Inside Cloud File Sharing Environment Using Lightweight Containers, IEEE, 978-1-4799-8633-0/15, 2015 (Year: 2015).*

(Continued)

*Primary Examiner* — Peter C Shaw
(74) *Attorney, Agent, or Firm* — Harrity & Harrity, LLP

(57) ABSTRACT

A device processes, with a model, an application to identify a set of file paths with process identifiers. The device identifies patterns associated with the set of file paths with process identifiers, and determines positions of random elements in each file path of the set of file paths with process identifiers. The device processes the patterns and the positions of the random elements to train a machine learning model, and utilizes the machine learning model to generate a first set of rules to identify files required for execution of the application, and a second set of rules to identify files not required for execution of the application. The device generates a mandatory access control policy based on the first set of rules and the second set of rules, and provides the mandatory access control policy to be implemented by an operating system of a client device.

20 Claims, 15 Drawing Sheets

(51) Int. Cl.
*G06F 16/10* (2019.01)
*G06F 21/60* (2013.01)
*G06N 5/00* (2006.01)
*H04L 29/06* (2006.01)

(56) References Cited

U.S. PATENT DOCUMENTS

| | | | |
|---|---|---|---|
| 2011/0202905 A1* | 8/2011 | Mahajan | H04L 67/34 |
| | | | 717/140 |
| 2013/0179479 A1* | 7/2013 | Chakra | G06F 16/16 |
| | | | 707/822 |
| 2018/0018459 A1 | 1/2018 | Zhang et al. | |
| 2018/0082063 A1 | 3/2018 | Kuppa et al. | |
| 2019/0095441 A1* | 3/2019 | Scrivano | G06F 16/51 |

OTHER PUBLICATIONS

Extended European Search Report for Application No. EP19199470.6, dated Mar. 20, 2020, 6 pages.

* cited by examiner

UTILIZING HEURISTIC AND MACHINE LEARNING MODELS TO GENERATE A MANDATORY ACCESS CONTROL POLICY FOR AN APPLICATION

BACKGROUND

In computer security, a mandatory access control policy is a type of access control by which an operating system constrains an ability of a subject to access or generally perform some sort of operation on an object. In practice, a subject may include a file, an operation, a process, a thread, and/or the like, and an object may include a file path, a directory, a port, shared memory segments, an input/output device, and/or the like.

SUMMARY

According to some implementations, a method may include receiving an application to be executed by an operating system of a client device, and processing, with a heuristic model, the application to identify a first set of file paths with process identifiers. The method may include processing, with a first machine learning model, the application to identify a second set of file paths with process identifiers, and identifying patterns associated with the first set of file paths and the second set of file paths. The method may include determining positions of random elements in each file path of the first set of file paths and the second set of file paths, and processing the patterns and the positions of the random elements to train a second machine learning model. The method may include utilizing the second machine learning model to generate a first set of rules to identify files required for execution of the application, and a second set of rules to identify files not required for execution of the application, where the second set of rules enable the operating system of the client device to block the files not required for execution of the application. The method may include generating a mandatory access control policy based on the first set of rules and the second set of rules, and causing the mandatory access control policy to be implemented by the operating system of the client device.

According to some implementations, a device may include one or more memories, and one or more processors, communicatively coupled to the one or more memories, to process, with a model, an application to identify a set of file paths with process identifiers, where the application is to be executed by an operating system of a client device. The one or more processors may identify patterns associated with the set of file paths with process identifiers, and may determine positions of random elements in each file path of the set of file paths with process identifiers. The one or more processors may process the patterns and the positions of the random elements to train a machine learning model, and may utilize the machine learning model to generate a first set of rules to identify files required for execution of the application, and a second set of rules to identify files not required for execution of the application, where the second set of rules enable the operating system of the client device to block the files not required for execution of the application. The one or more processors may generate a mandatory access control policy based on the first set of rules and the second set of rules, and may provide, to the client device, the mandatory access control policy to be implemented by the operating system of the client device during execution of the application by the client device.

According to some implementations, a non-transitory computer-readable medium may store instructions that include one or more instructions that, when executed by one or more processors of a device, cause the one or more processors to process, with a first model, an application to identify a first set of file paths with process identifiers, where the application is to be executed by an operating system of a client device. The one or more instructions may cause the one or more processors to process, with a second model, the application to identify a second set of file paths with process identifiers, and identify patterns associated with the first set of file paths and the second set of file paths. The one or more instructions may cause the one or more processors to determine positions of random elements in each file path of the first set of file paths and the second set of file paths, and process the patterns and the positions of the random elements to generate a third model. The one or more instructions may cause the one or more processors to utilize the third model to generate a first set of rules to identify files required for execution of the application, and a second set of rules to identify files not required for execution of the application, where the second set of rules enable the operating system of the client device to block the files not required for execution of the application. The one or more instructions may cause the one or more processors to generate a mandatory access control policy based on the first set of rules and the second set of rules, and cause the mandatory access control policy to be implemented by the operating system of the client device. The one or more instructions may cause the one or more processors to receive, from the client device, feedback associated with implementing the mandatory access control policy in the operating system of the client device, and perform one or more actions based on the feedback.

DETAILED DESCRIPTION

Figure 1A:
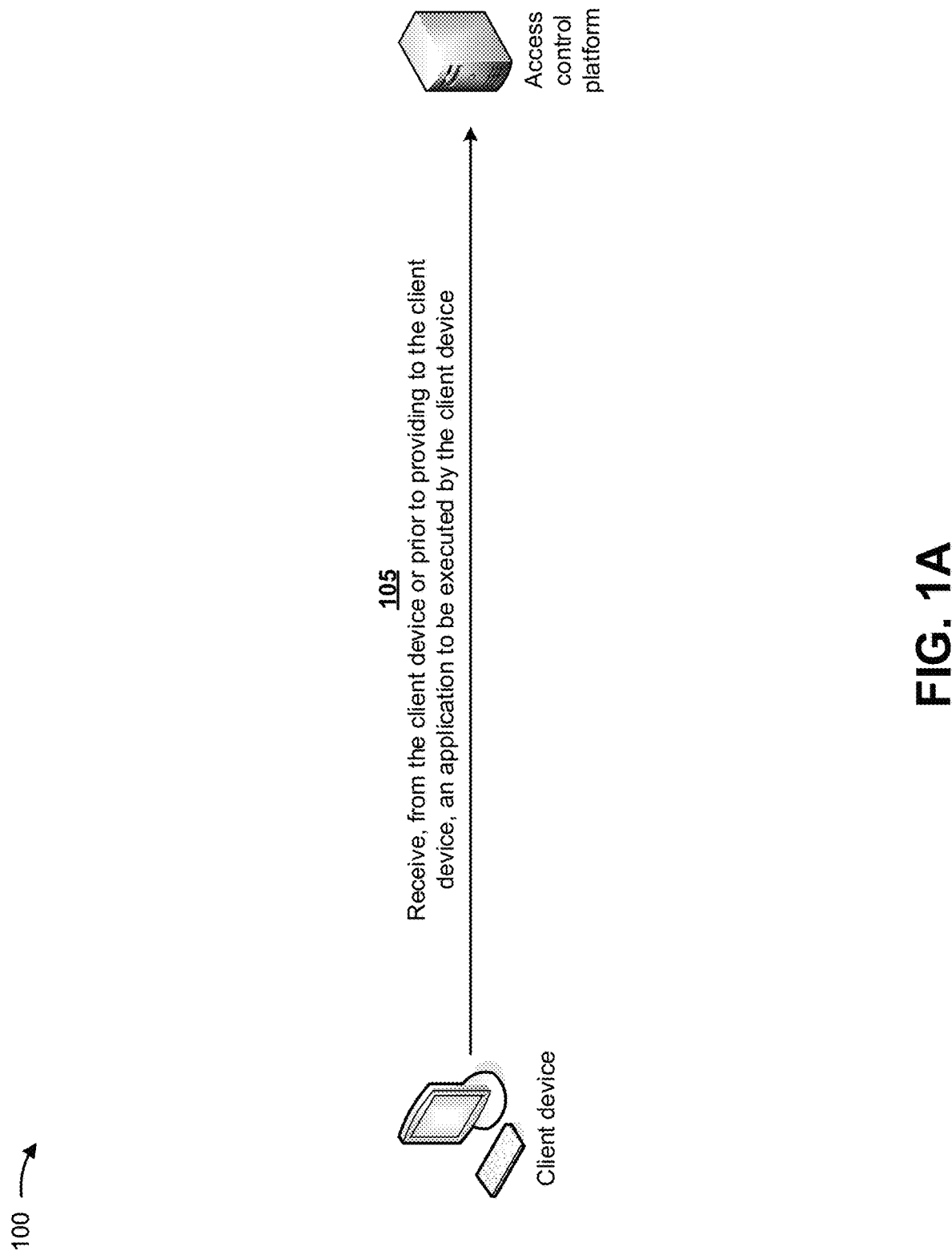
FIGS. 1A-1J are diagrams of an example implementation described herein.

The following detailed description of example implementations refers to the accompanying drawings. The same reference numbers in different drawings may identify the same or similar elements.

A mandatory access control policy is used by an operating system to restrict access of one or more files (e.g., operations, processes, threads, and/or the like) of an application. The mandatory access control policy provides security for the operating system against unnecessary files of an application that are not required to execute the application. However, a mandatory access control policy is not provided for a new application, and the operating system is unaware of the unnecessary files of the application.

Some implementations described herein provide an access control platform that utilizes heuristic and machine learning models to generate a mandatory access control policy for an application. For example, the access control platform may process, with a first model, an application to identify a first set of file paths with process identifiers, where the application is to be executed by an operating system of a client device, and may process, with a second model, the application to identify a second set of file paths with process identifiers. The access control platform may identify patterns associated with the first set of file paths and the second set of file paths, and may determine positions of random elements in each file path of the first set of file paths and the second set of file paths. The access control platform may process the patterns and the positions of the random elements to generate a third model, and may utilize the third model to generate a first set of rules to identify files required for execution of the application, and a second set of rules to identify files not required for execution of the application, where the second set of rules enable the operating system of the client device to block the files not required for execution of the application. The access control platform may generate a mandatory access control policy based on the first set of rules and the second set of rules, and may cause the mandatory access control policy to be implemented by the operating system of the client device.

In this way, the access control platform may generate mandatory access control policies, for operating systems of client devices, that enable execution of files required to execute applications on the client devices and that prevent execution of unnecessary files that are not required to execute the applications on the client devices. The unnecessary files may pose security threats to the client devices. Thus, preventing the execution of such unnecessary files provides increased security for the client devices. Furthermore, preventing the execution of such unnecessary files conserves resources (e.g., processing resources, memory resources, and/or the like) that would otherwise be wasted executing the unnecessary files. The access control platform also enables generation of mandatory access control policies for new applications that operating systems of client devices do not know anything.

FIGS. 1A-1J are diagrams of an example implementation 100 described herein. As shown in FIG. 1A, a client device may be associated with an access control platform. As further shown in FIG. 1A, and by reference number 105, the access control platform may receive, from the client device or prior to providing to the client device, an application to be executed by the client device. In some implementations, the application may be stored on the client device, and the client device may provide the application to the access control platform. In some implementations, the access control platform may provide, to the client device, an instruction that causes the client device to provide the application to the access control platform. In some implementations, the application may be provided in a storage device or another device (e.g., a source device) associated with the access control platform, and may be received from the storage device or the source device by the access control platform. In such implementations, the access control platform may process the application, in a manner described herein, prior to providing the application to the client device. In some implementations, when the application is received from the client device, the access control platform may store the application in the storage device associated with the access control platform.

In some implementations, tens, hundreds, thousands, millions, and/or the like of applications may be received by the access control platform from tens, hundreds, thousands, and/or the like of client devices. The access control platform may process the tens, hundreds, thousands, millions, and/or the like of applications, in a manner described herein, to generate tens, hundreds, thousands, millions, and/or the like of mandatory access control policies for the applications.

Figure 1B:
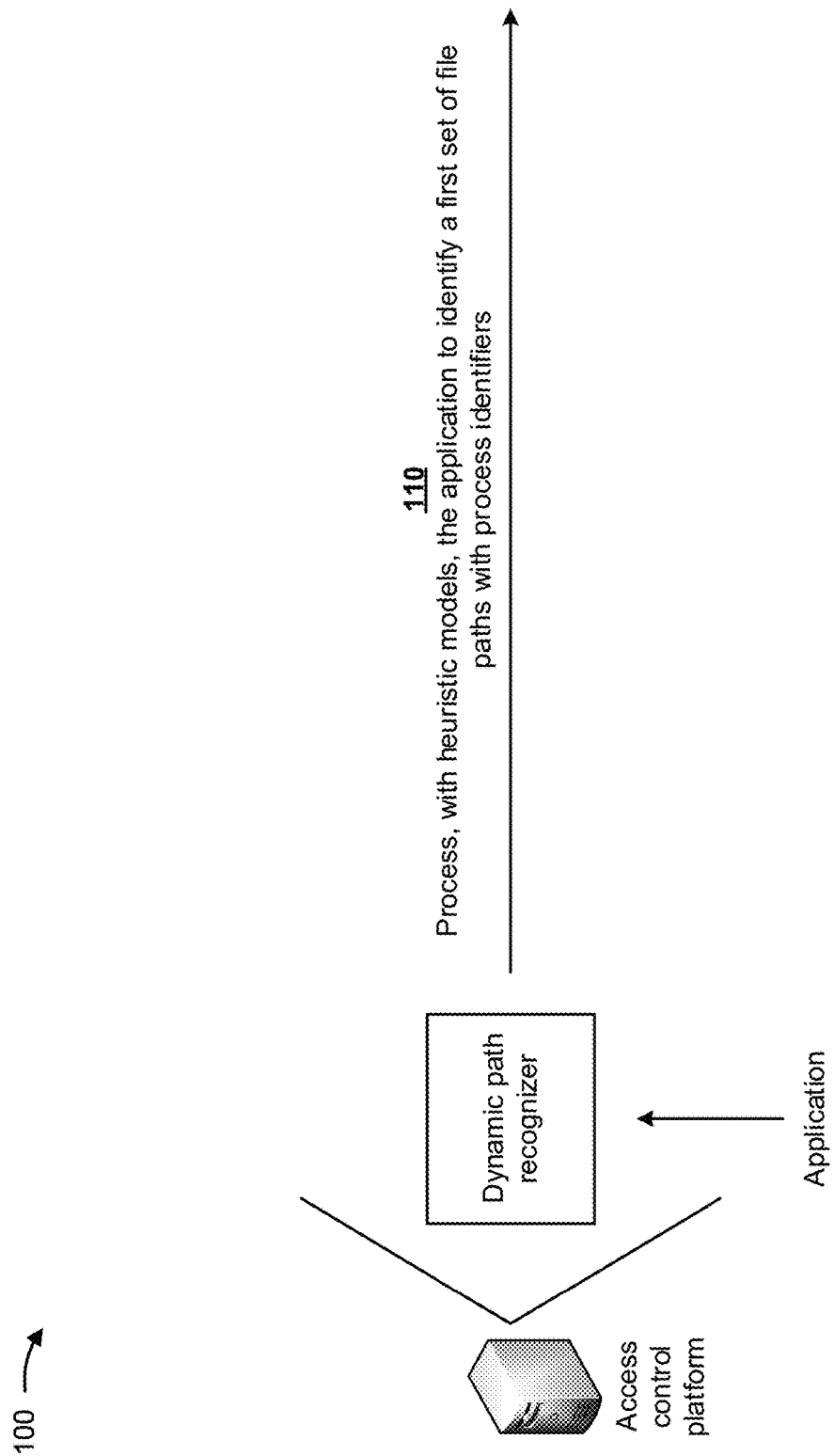

As shown in FIG. 1B, and by reference number 110, a dynamic path recognizer of the access control platform may process the application, with one or more heuristic models, to identify a first set of file paths with process identifiers. In some implementations, the application may include hundreds, thousands, and/or the like of file paths with process identifiers. For example, the application may include the following file paths with process identifiers:

/var/folders/g8/jp9vd6yn3vxcrcsszg_d6lqm0000gn/T1/tmp.gKz15eEB
/var/folders/g8/jp9vd6yn3vxcrcsszg_d6lqm0000gn/T1/tmp.Idm49h3r
/var/folders/g8/jp9vd6yn3vxcrcsszg_d6lqm0000gn/T1/tmp.zjMftiuP
/var/folders/g8/jp9vd6yn3vxcrcsszg_d6lqm0000gn/T2/tmp.zYx65fGD
/var/folders/g8/jp9vd6yn3vxcrcsszg_d6lqm0000gn/T2/tmp.aDq43GPe
/var/folders/g8/jp9vd6yn3vxcrcsszg_d6lqm0000gn/T2/tmp.bx789PeD, where "/var/folders/g8/jp9vd6yn3vxcrcsszg_d6lqm0000gn/" may correspond to a file path, "T1" may correspond to a first process identifier, "T2" may correspond to a second process identifier, and/or the like.

In some implementations, a heuristic model may include a maximum entropy model, an availability model, an edit distance model, and/or the like. In some implementations, the access control platform may utilize more than one heuristic model to identify the first set of file paths with process identifiers. The maximum entropy model may include a model that provides a statistical inference (e.g., a maximum entropy estimate) based on partial knowledge of probability distributions (e.g., probability distributions that are missing information). The maximum entropy estimate provides a least biased estimate possible for given information (e.g., when characterizing unknown events, the maximum entropy model may select a characterization that includes a maximum entropy). The availability model may include a model that assesses a frequency of a class or a probability of an event. The availability model may assess a frequency of a class or a probability of an event because instances of large classes are usually identified easier and faster than instances of less frequent classes. The edit distance model may include a model that quantifies how dissimilar two strings (e.g., words) are to one another by counting a minimum number of operations required to transform one string into the other string.

Figure 1C:
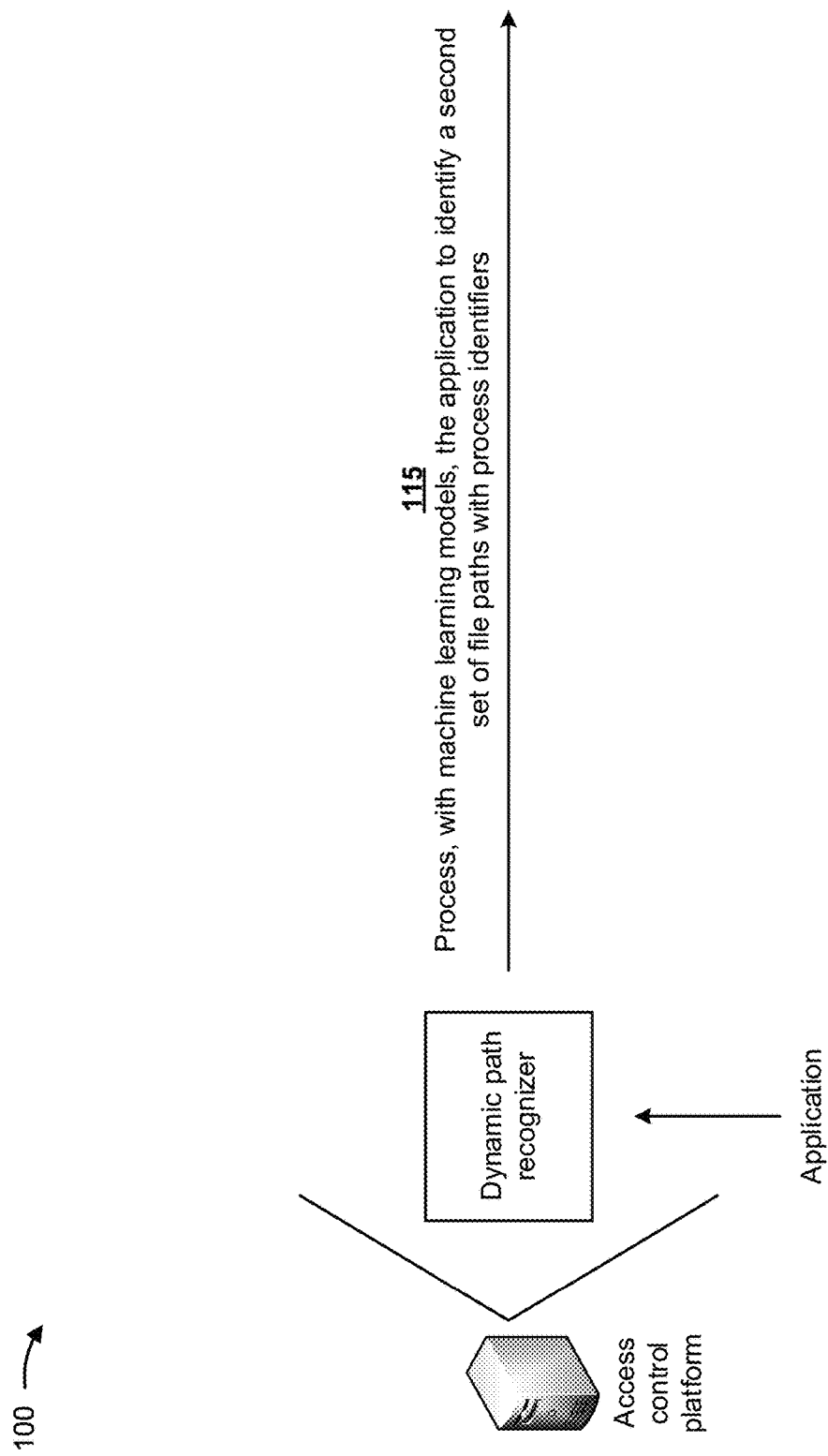

As shown in FIG. 1C, and by reference number 115, the dynamic path recognizer of the access control platform may process the application, with one or more machine learning models, to identify a second set of file paths with process identifiers. In some implementations, the application may include hundreds, thousands, and/or the like of file paths with process identifiers. For example, the application may include the file paths with process identifiers described above in connection with FIG. 1B.

In some implementations, the access control platform may not process the application with the one or more machine learning models, but may process the application with the one or more heuristic models. In this way, the access control platform may conserve resources (e.g., processing resources, memory resources, and/or the like) since machine learning models utilize more resources than heuristic models. In some implementations, the access control platform may not process the application with the one or more heuristic models, but may process the application with the one or more machine learning models. In this way, the access control platform may identify more file paths with process identifiers since machine learning models are more comprehensive than heuristic models. In some implementations, the access control platform may process the application with both the one or more heuristic models and the one or more machine learning models. In this way, the access control platform may identify the most comprehensive sets of file paths with process identifiers since one or more file paths in the first set of file paths may differ from one or more file paths in the second set of file paths.

In some implementations, a machine learning model may include a naïve Bayes classifier model, a support vector machine model, a random Forest model, and/or the like. In some implementations, the access control platform may utilize more than one machine learning model to identify the second set of file paths with process identifiers.

In some implementations, the access control platform may perform a training operation on the machine learning model with historical file path information (e.g., historical information that includes file paths with process identifiers). For example, the access control platform may separate the historical file path information into a training set, a validation set, a test set, and/or the like. In some implementations, the access control platform may train the machine learning model using, for example, an unsupervised training procedure and based on the training set of the historical file path information. For example, the access control platform may perform dimensionality reduction to reduce the historical file path information to a minimum feature set, thereby reducing resources (e.g., processing resources, memory resources, and/or the like) to train the machine learning model, and may apply a classification technique, to the minimum feature set.

In some implementations, the access control platform may use a logistic regression classification technique to determine a categorical outcome (e.g., that the historical file path information includes file paths identifying files that are unnecessary for execution of an application). Additionally, or alternatively, the access control platform may use a naïve Bayesian classifier technique. In this case, the access control platform may perform binary recursive partitioning to split the historical file path information into partitions and/or branches, and use the partitions and/or branches to perform predictions (e.g., that the historical file path information includes file paths identifying files that are unnecessary for execution of an application). Based on using recursive partitioning, the access control platform may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the access control platform may use a support vector machine (SVM) classifier technique to generate a non-linear boundary between data points in the training set. In this case, the non-linear boundary is used to classify test data into a particular class.

Additionally, or alternatively, the access control platform may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the access control platform may use one or more other model training techniques, such as a neural network technique, a latent semantic indexing technique, and/or the like. For example, the access control platform may perform an artificial neural network processing technique (e.g., using a two-layer feedforward neural network architecture, a three-layer feedforward neural network architecture, and/or the like) to perform pattern recognition with regard to file paths identifying files that are unnecessary for execution of an application. In this case, using the artificial neural network processing technique may improve an accuracy of the trained machine learning model generated by the access control platform by being more robust to noisy, imprecise, or incomplete data, and by enabling the access control platform to detect patterns and/or trends undetectable to human analysts or systems using less complex techniques.

Figure 1D:
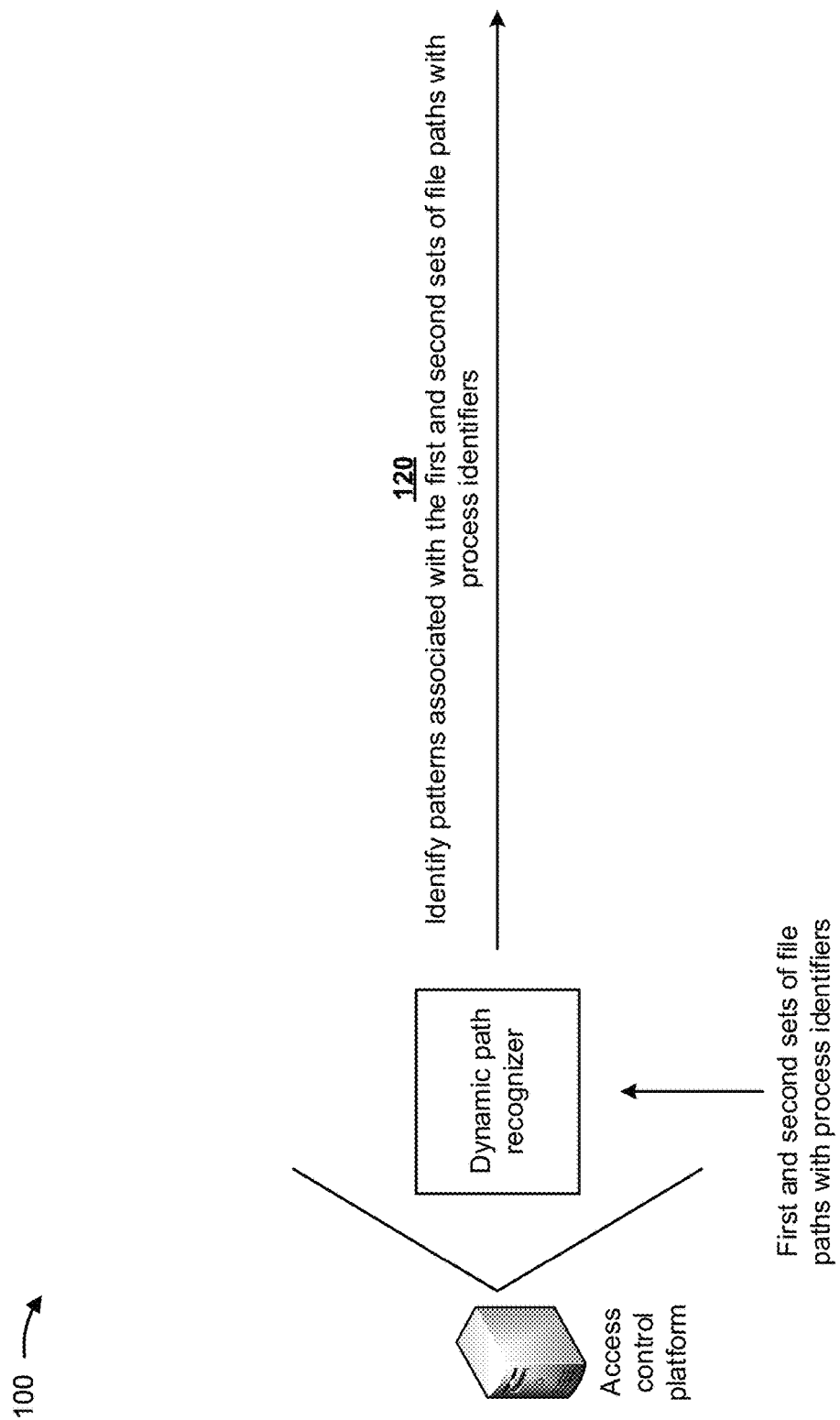

As shown in FIG. 1D, and by reference number 120, the dynamic path recognizer of the access control platform may identify patterns associated with the first set of file paths with process identifiers and the second set of file paths with process identifiers. For example, assume that the application includes the following file paths with process identifiers:

/var/folders/g8/jp9vd6yn3vxcrcsszg_d6lqm0000gn/T1/tmp.gKz15eEB
/var/folders/g8/jp9vd6yn3vxcrcsszg_d6lqm0000gn/T1/tmp.Idm49h3r
/var/folders/g8/jp9vd6yn3vxcrcsszg_d6lqm0000gn/T1/tmp.zjMftiuP
/var/folders/g8/jp9vd6yn3vxcrcsszg_d6lqm0000gn/T2/tmp.zYx65fGD
/var/folders/g8/jp9vd6yn3vxcrcsszg_d6lqm0000gn/T2/tmp.aDq43GPe
/var/folders/g8/jp9vd6yn3vxcrcsszg_d6lqm0000gn/T2/tmp.bx789PeD.

In such an example, the access control platform may determine that all of the file paths include the same introductory syntax (e.g., /var/folders/g8/jp9vd6yn3vxcrcsszg_d6lqm0000gn/), that some of the file paths include the same first process identifier (e.g., T1), that some of the file paths include the same second process identifier (e.g., T2), and that all of the file paths include a unique extension for a "tmp" file (e.g., tmp.gKz15eEB, tmp.Idm49h3r, tmp.zjMftiuP, tmp.zYx65fGD, tmp.aDq43GPe, and tmp.bx789PeD). Such information may be considered patterns associated with the first set of file paths with process identifiers and the second set of file paths with process identifiers.

Figure 1E:
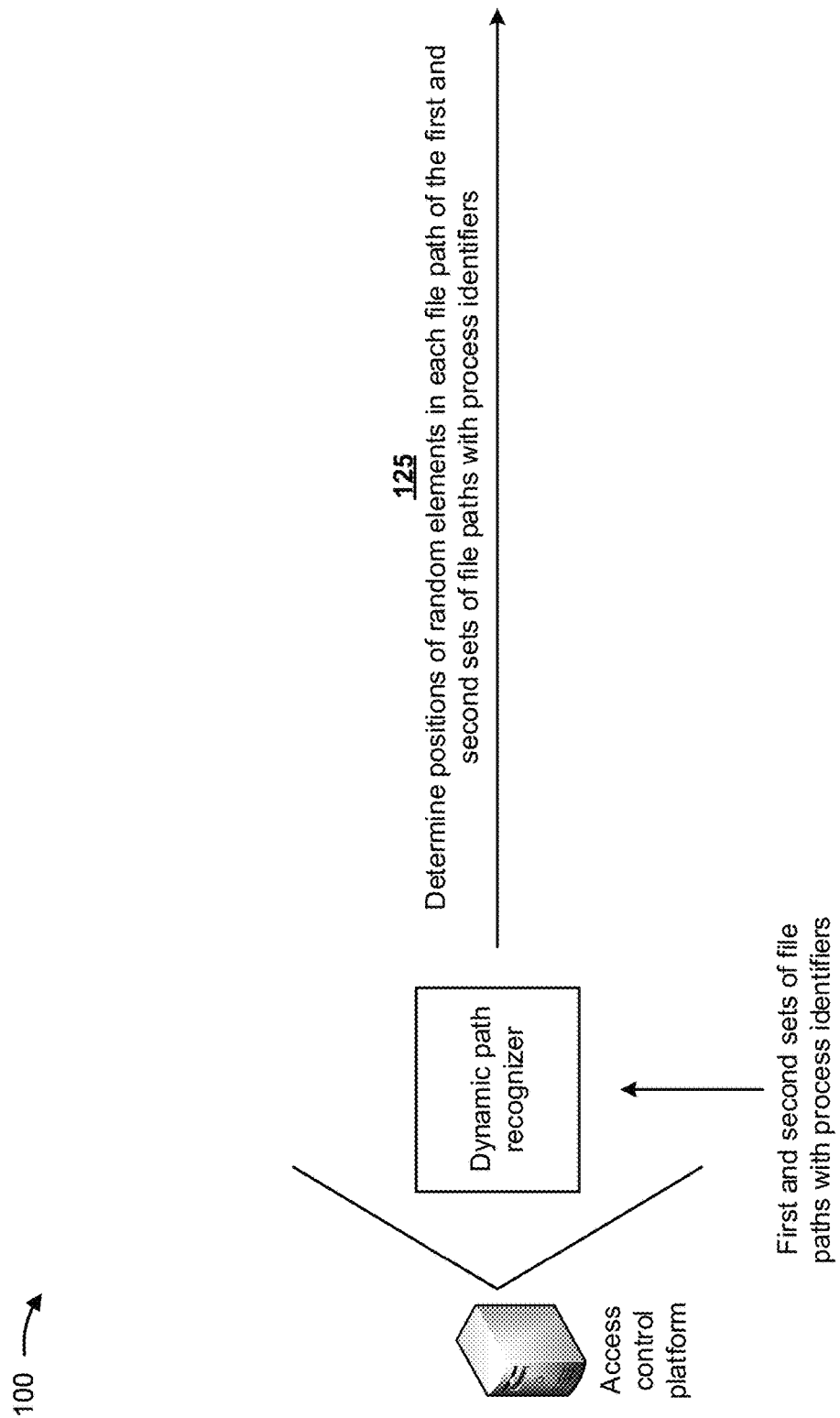

As shown in FIG. 1E, and by reference number 125, the dynamic path recognizer of the access control platform may determine positions of random elements in each file path of the first set of file paths with process identifiers and the second set of file paths with process identifiers. For example, assume that the application includes the following file paths with process identifiers:

/var/folders/g8/jp9vd6yn3vxcrcsszg_d6lqm0000gn/T1/tmp.gKz15eEB
/var/folders/g8/jp9vd6yn3vxcrcsszg_d6lqm0000gn/T1/tmp.Idm49h3r
/var/folders/g8/jp9vd6yn3vxcrcsszg_d6lqm0000gn/T1/tmp.zjMftiuP
/var/folders/g8/jp9vd6yn3vxcrcsszg_d6lqm0000gn/T2/tmp.zYx65fGD
/var/folders/g8/jp9vd6yn3vxcrcsszg_d6lqm0000gn/T2/tmp.aDq43GPe
/var/folders/g8/jp9vd6yn3vxcrcsszg_d6lqm0000gn/T2/tmp.bx789PeD.

In such an example, the access control platform may determine that all of the file paths include a "tmp" file with extensions that are random elements (e.g., the extensions gKz15eEB, Idm49h3r, zjMftiuP, zYx65fGD, aDq43GPe, and bx789PeD are random elements of the respective file paths). The access control platform may determine that the positions of such random elements are at the end of the respective file paths and are extensions of the "tmp" file.

Figure 1F:
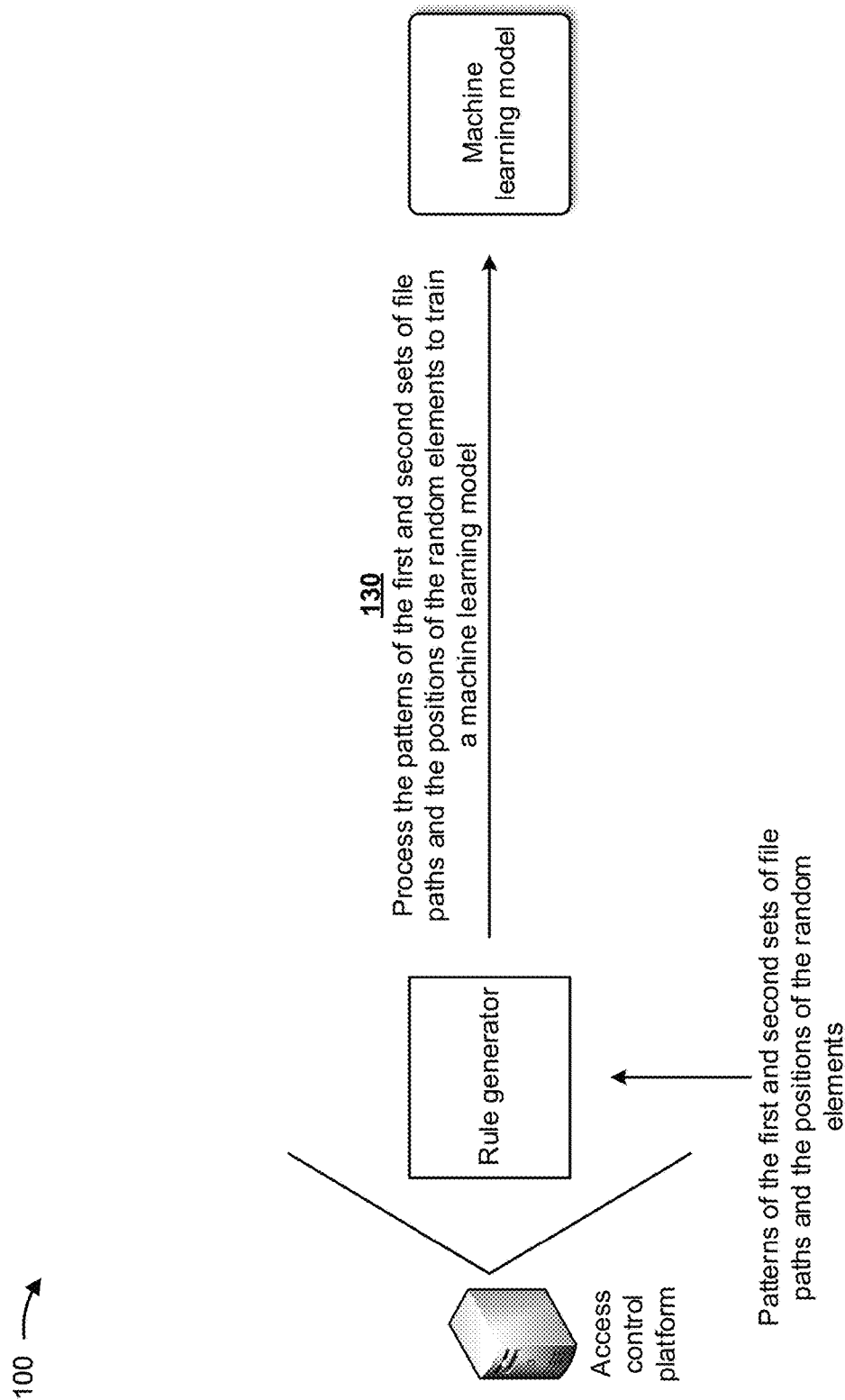

As shown in FIG. 1F, and by reference number 130, a rule generator of the access control platform may process the patterns, associated with the first set of file paths with process identifiers and the second set of file paths with process identifiers, and the positions of the random elements, in each file path of the first set of file paths with process identifiers and the second set of file paths with process identifiers, to generate a machine learning model. In some implementations, the access control platform may utilize the patterns, associated with the first set of file paths with process identifiers and the second set of file paths with process identifiers, and the positions of the random elements, in each file path of the first set of file paths with process identifiers and the second set of file paths with process identifiers, as training data for training the machine learning model.

In some implementations, the generated and/or trained machine learning model may include a naïve Bayes classifier model, a support vector machine model, a random Forest model, and/or the like. In some implementations, the access control platform may generate and/or train more than one machine learning model based on the patterns of the first and second sets of file paths and the positions of the random elements. In some implementations, the access control platform may perform a training operation on the machine learning model with the patterns, associated with the first set of file paths with process identifiers and the second set of file paths with process identifiers, and the positions of the random elements, in each file path of the first set of file paths with process identifiers and the second set of file paths with process identifiers, in the manner described above in connection with FIG. 1C.

Figure 1G:
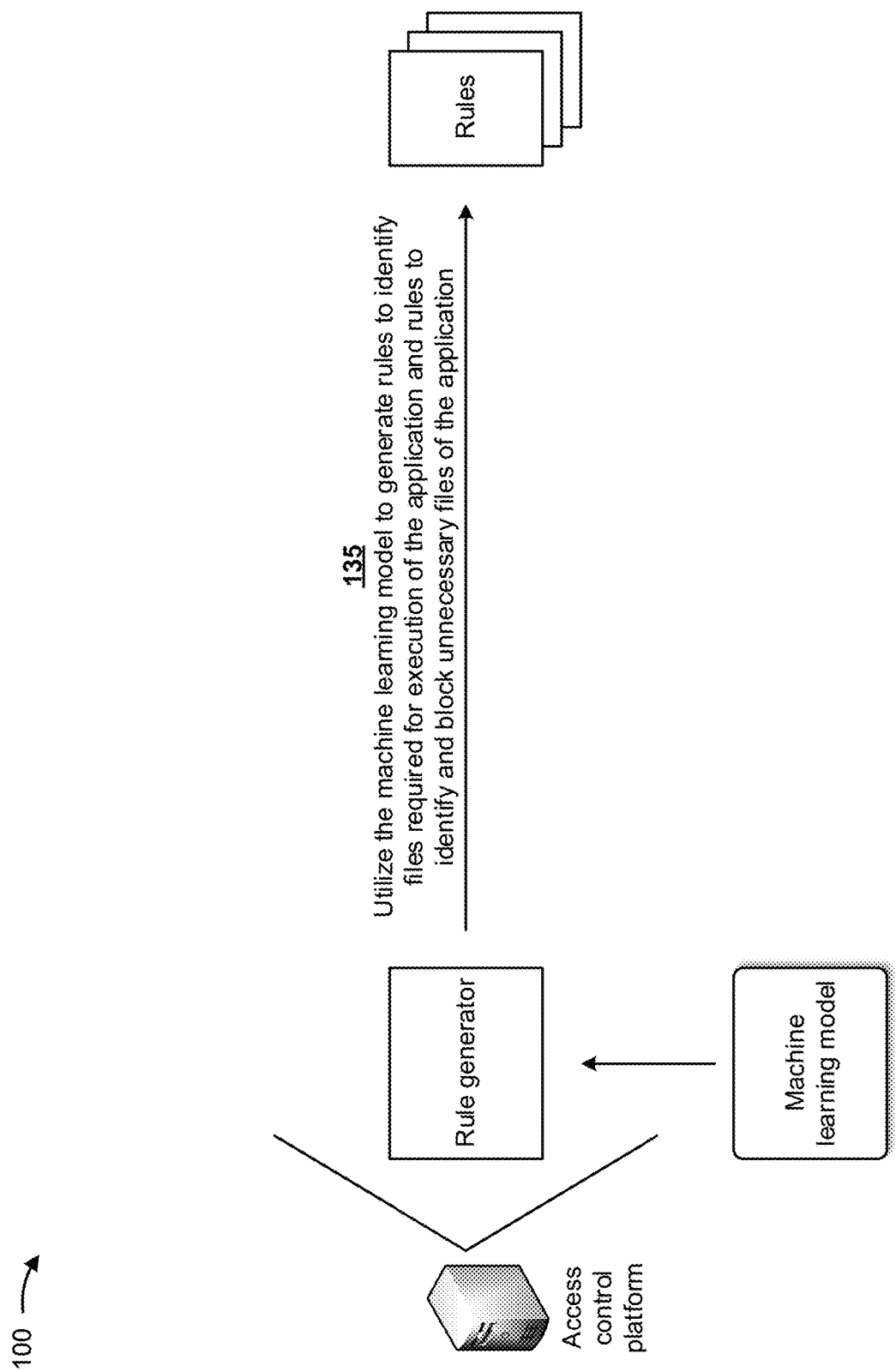

As shown in FIG. 1G, and by reference number 135, the rule generator of the access control platform may utilize the machine learning model to generate rules to identify files required for execution of the application and rules to identify and block unnecessary files of the application (e.g., files not required for execution of the application). In some implementations, the files required for execution of the application may include read files, write files, execute files, and/or the like. In some implementations, the unnecessary files may include files of the application that are not read files, write files, execute files, and/or the like.

In some implementations, the rules to identify the files required for execution of the application may include rules indicating that read files, write files, execute files, and/or the like may be executed by an operating system of the client device. In some implementations, the rules to identify and block the unnecessary files of the application may include rules indicating that files other than read files, write files, execute files, and/or the like are unnecessary and are to be blocked (e.g., may not be executed) by the operating system of the client device.

Figure 1H:
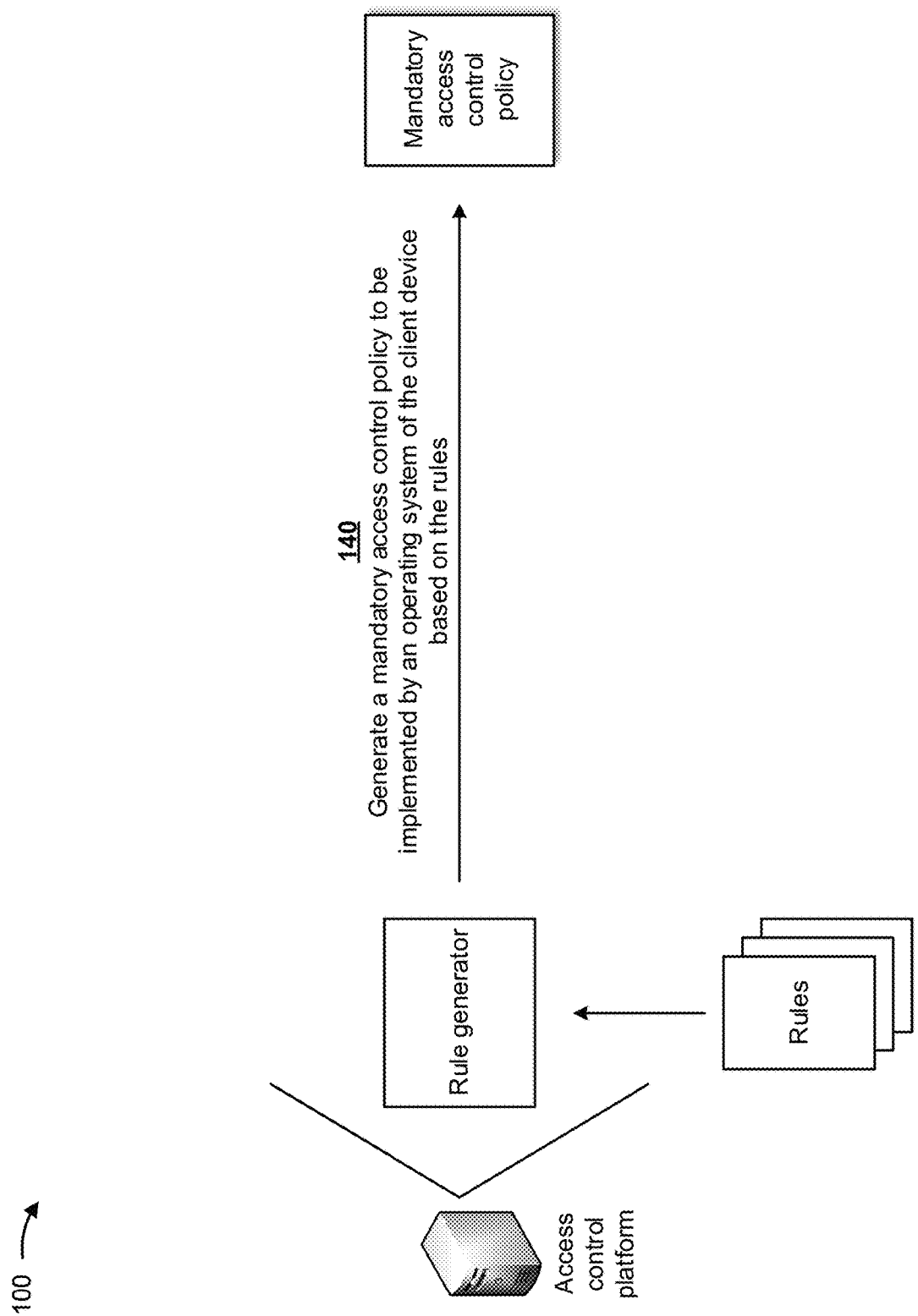

As shown in FIG. 1H, and by reference number 140, the rule generator of the access control platform may generate a mandatory access control policy to be implemented by an operating system of the client device based on the rules. In some implementations, the mandatory access control policy may include the rules to identify the files required for execution of the application and the rules to identify and block the unnecessary files of the application. In some implementations, the mandatory access control policy may be generated in a format that may be understood by the operating system of the client device. In some implementations, if the application is to be provided to client devices with different operating systems, the access control platform may generate multiple mandatory access control policies in formats that may be understood by the different operating systems. In some implementations, the access control platform may determine what type of operating system is being utilized by the client device (e.g., a Linux operating system) and what format of the mandatory access control policy is understood by the operating system (e.g., a Linux format, a security-enhanced Linux (SELinux) format, an application armor (AppArmor) format, and/or the like), and may modify or generate the mandatory access control policy based on the determined format.

Figure 1I:
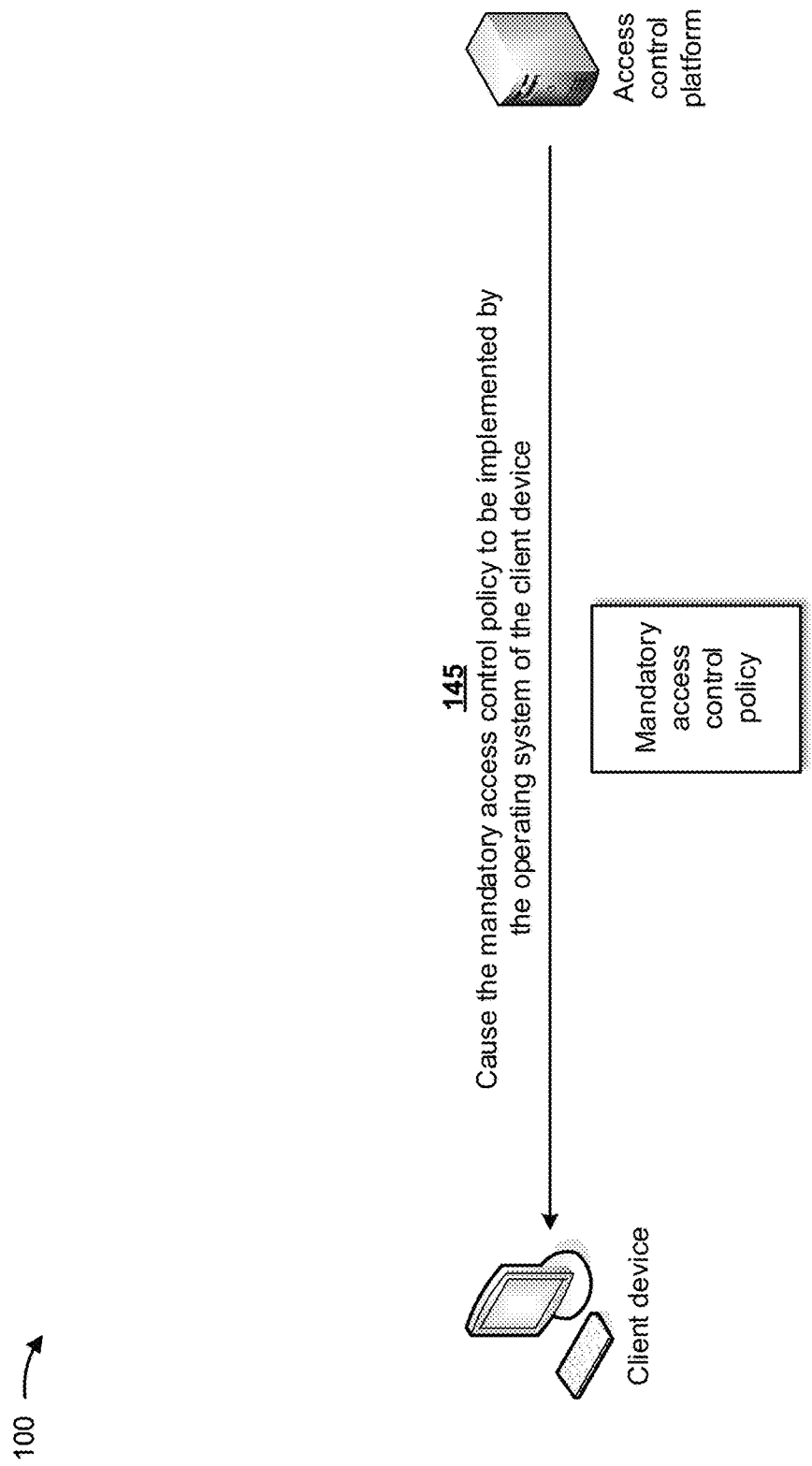

As shown in FIG. 1I, and by reference number 145, the access control platform may cause the mandatory access control policy to be implemented by the operating system of the client device. In some implementations, the access control platform may provide, to the client device, the mandatory access control policy and an instruction that instructs the client device to install or implement the mandatory access control policy in the operating system of the client device. In some implementations, when the application has not been provided to the client device, the access control platform may provide the application and the mandatory access control policy to the client device, and the operating system of the client device may automatically implement the mandatory access control policy when the client device executes the application. In some implementations, when the application originated from the client device, the access control platform may provide the mandatory access control policy to the client device, and the operating system of the client device may automatically implement the mandatory access control policy when the client device executes the application.

Figure 1J:
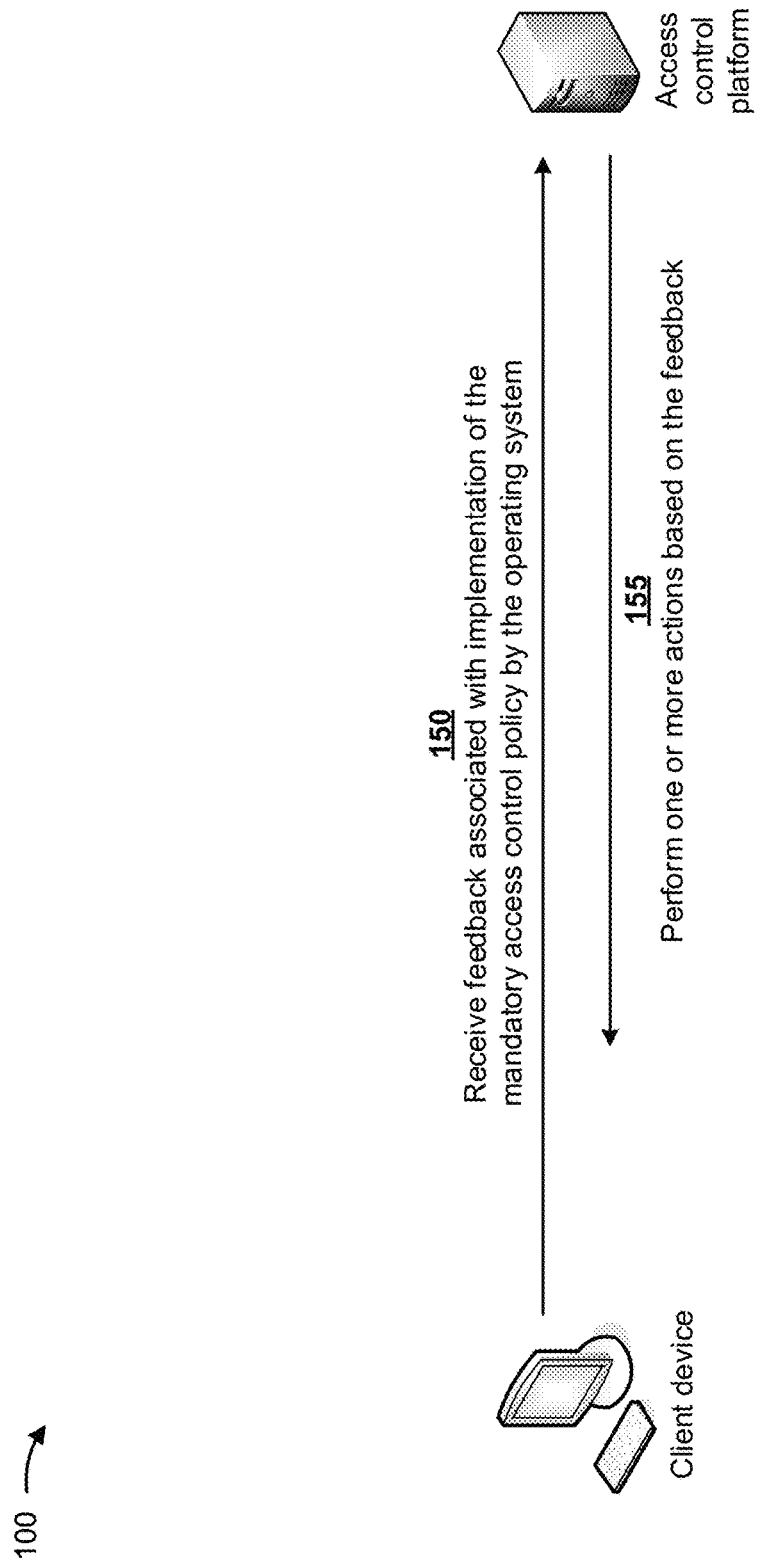

As shown in FIG. 1J, and by reference number 150, the access control platform may receive feedback associated with implementation of the mandatory access control policy by the operating system of the client device. For example, when the client device executes the application, the client device may automatically implement the mandatory access control policy, may identify and permit execution of necessary files of the application (e.g., files required for execution of the application), and may identify and block unnecessary files of the application. In such an example, the client device may store information indicating the necessary files that are executed and the unnecessary files that are blocked, and may provide such information to the access control platform as feedback.

In some implementations, the feedback may include information indicating that the application did not operate correctly (e.g., the application failed) because a required file was incorrectly identified as unnecessary and was blocked. In such implementations, the access control policy may utilize such information to update the machine learning model and the rules generated by the machine learning model. In some implementations, the feedback may include information indicating that the application operated correctly (e.g., the application executed), which may indicate that the mandatory access control policy functioned correctly.

As further shown in FIG. 1J, and by reference number 155, the access control platform may perform one or more actions based on the feedback. In some implementations, the one or more actions may include comparing the feedback (e.g., the information indicating the necessary files that are executed and the unnecessary files that are blocked) with outputs generated by the machine learning model described above in connection with FIGS. 1F and 1G. If the feedback and the outputs match, the access control platform may determine that the mandatory access control policy is functioning correctly and may take no action. However, if the feedback and the outputs do not match, the access control platform may retrain the machine learning model with the feedback in order to improve the machine learning model, and may generate a new mandatory access control policy with the improved machine learning model. The access control platform may provide the new mandatory access control policy to the client device for implementation. In this way, the access control platform may constantly improve mandatory access control policies as new information becomes available.

In some implementations, the one or more actions may include identifying a security issue for the client device based on the feedback. For example, if the feedback indicates that the application includes malicious code that is or is not being blocked by the client device, the access control platform may modify the application to remove the malicious code from the application. In this way, the access control platform may prevent the malicious code from spreading to other client devices and/or other applications.

In some implementations, the one or more actions may include the access control platform reanalyzing the application to verify that all of the malicious code has been removed. In this way, the access control platform may ensure that no malicious code is present in the application.

In some implementations, the one or more actions may include the access control platform providing the modified application to the client device for execution. For example, after verifying that all of the malicious code has been removed from the application, the access control platform may provide the application to the client device, and the client device may execute the application. In this way, the client device may execute an application that is free of malicious code.

In some implementations, the one or more actions may include the access control platform sending, to the client device, instructions that cause the client device to modify the application to remove the malicious code. For example, the client device may hold the application in quarantine, and the access control platform may cause the client device to remove the malicious code from the application in quarantine. In this way, the access control platform may prevent the malicious code from infecting the client device.

In some implementations, the one or more actions may include the access control platform reporting the malicious code to particular devices (e.g., via an alert). For example, the access control platform may report, to the particular devices, the malicious code from the application. In this way, the access control platform may prevent the malicious code from spreading to the particular devices.

In some implementations, the one or more actions may include the access control platform reporting the malicious code to a security device associated with the client device and/or a plurality of client devices (e.g., including the client device) to cause the security device to update rules and improving security in a network associated with the security device.

In this way, several different stages of the process for generating a mandatory access control policy for an application are automated via heuristic and machine learning models, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that utilizes heuristic and machine learning models to generate a mandatory access control policy for an application. Finally, automating the process for generating a mandatory access control policy for an application conserves computing resources (e.g., processing resources, memory resources, and/or the like) that would otherwise be wasted in attempting to generate a mandatory access control policy for an application.

As indicated above, FIGS. 1A-1J are provided merely as examples. Other examples are possible and may differ from what was described with regard to FIGS. 1A-1J. For example, while the access control platform has been described as performing certain functions, one or more (or all) of these functions may be performed by another device, such as the client device.

Figure 2:
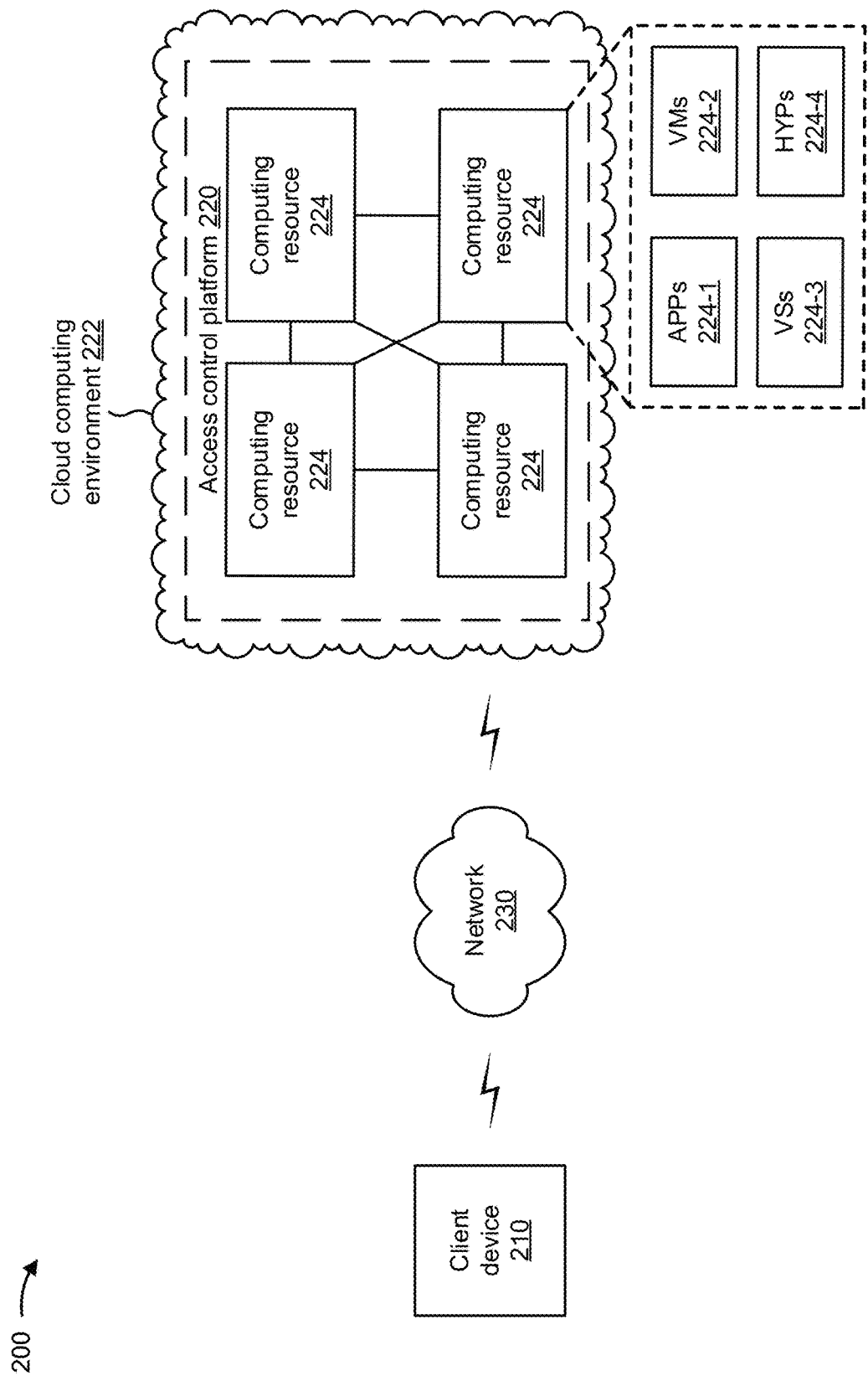
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a client device 210, an access control platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to access control platform 220.

Access control platform 220 includes one or more devices that utilize heuristic and machine learning models to generate a mandatory access control policy for an application. In some implementations, access control platform 220 may be designed to be modular such that certain software components may be swapped in or out depending on a particular need. As such, access control platform 220 may be easily and/or quickly reconfigured for different uses. In some implementations, access control platform 220 may receive information from and/or transmit information to one or more client devices 210.

In some implementations, as shown, access control platform 220 may be hosted in a cloud computing environment 222. Notably, while implementations described herein describe access control platform 220 as being hosted in cloud computing environment 222, in some implementations, access control platform 220 may not be cloud-based (i.e., may be implemented outside of a cloud computing environment) or may be partially cloud-based.

Cloud computing environment 222 includes an environment that hosts access control platform 220. Cloud computing environment 222 may provide computation, software, data access, storage, etc. services that do not require end-user knowledge of a physical location and configuration of system(s) and/or device(s) that hosts access control platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host access control platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with access control platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of client device 210 or an operator of access control platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
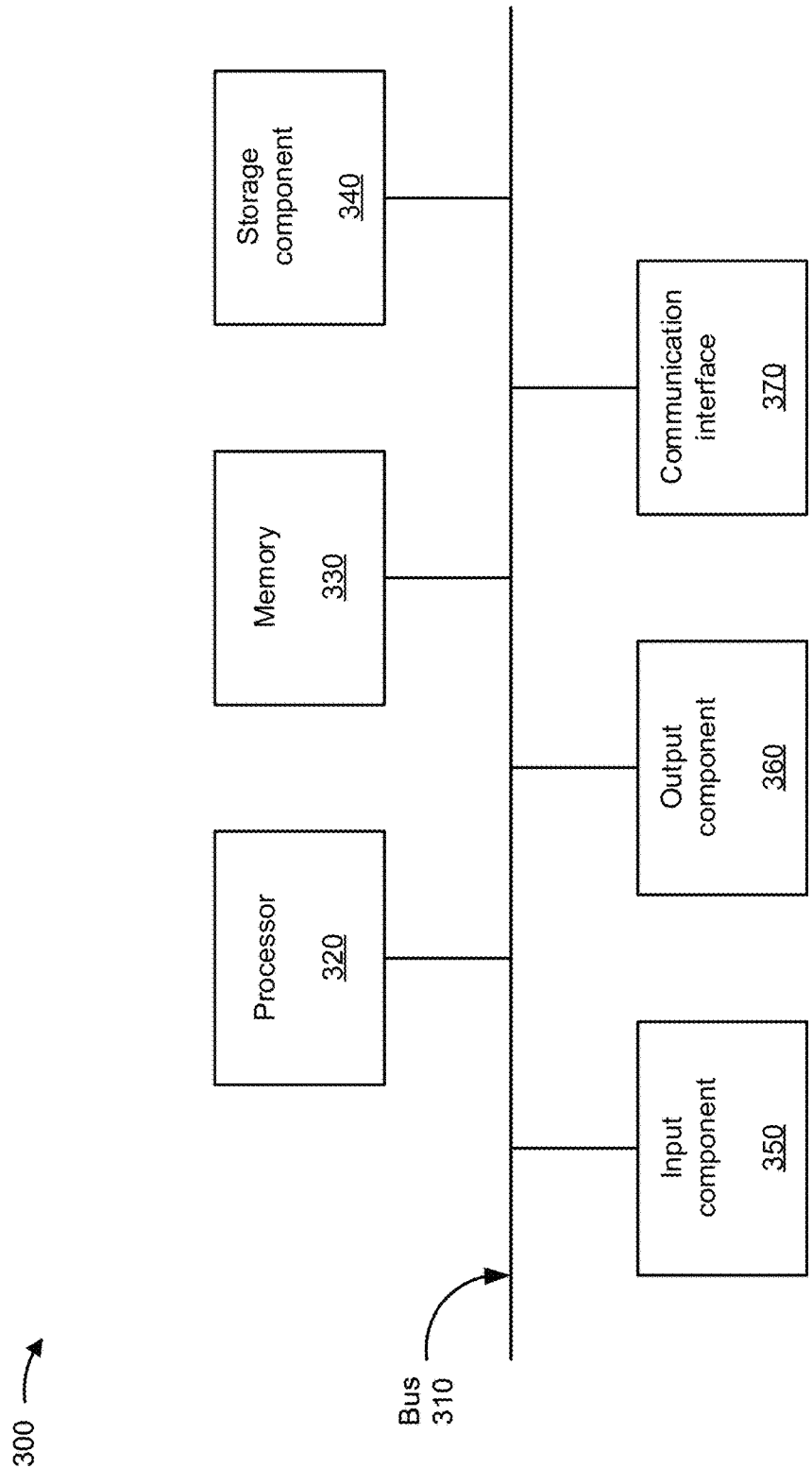
FIG. 3 is a diagram of example components of one or more devices of FIG. 2.

FIG. 3 is a diagram of example components of a device 300. Device 300 may correspond to client device 210, access control platform 220, and/or computing resource 224. In some implementations, client device 210, access control platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
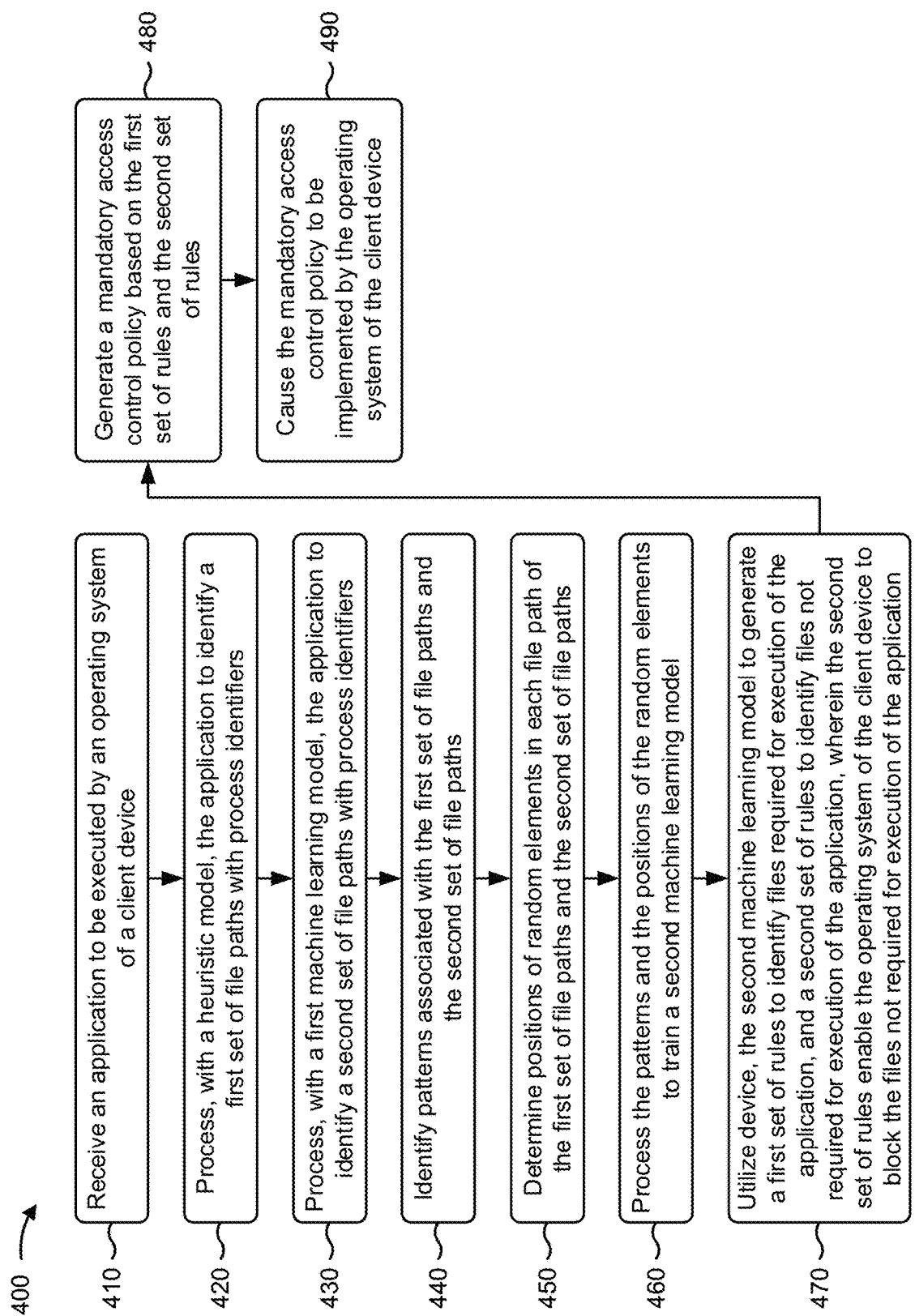
FIGS. 4-6 are flow charts of example processes for utilizing heuristic and machine learning models to generate a mandatory access control policy for an application.

FIG. 4 is a flow chart of an example process 400 for utilizing heuristic and machine learning models to generate a mandatory access control policy for an application. In some implementations, one or more process blocks of FIG. 4 may be performed by an access control platform (e.g., access control platform 220). In some implementations, one or more process blocks of FIG. 4 may be performed by another device or a group of devices separate from or including the access control platform, such as a client device (e.g., client device 210).

As shown in FIG. 4, process 400 may include receiving an application to be executed by an operating system of a client device (block 410). For example, the access control platform (e.g., using computing resource 224, processor 320, communication interface 370, and/or the like) may receive an application to be executed by an operating system of a client device, as described above in connection with FIGS. 1A-2.

As further shown in FIG. 4, process 400 may include processing, with a heuristic model, the application to identify a first set of file paths with process identifiers (block 420). For example, the access control platform (e.g., using computing resource 224, processor 320, memory 330, and/or the like) may process, with a heuristic model, the application to identify a first set of file paths with process identifiers, as described above in connection with FIGS. 1A-2.

As further shown in FIG. 4, process 400 may include processing, with a first machine learning model, the application to identify a second set of file paths with process identifiers (block 430). For example, the access control platform (e.g., using computing resource 224, processor 320, storage component 340, and/or the like) may process, with a first machine learning model, the application to identify a second set of file paths with process identifiers, as described above in connection with FIGS. 1A-2.

As further shown in FIG. 4, process 400 may include identifying patterns associated with the first set of file paths and the second set of file paths (block 440). For example, the access control platform (e.g., using computing resource 224, processor 320, memory 330, storage component 340, and/or the like) may identify patterns associated with the first set of file paths and the second set of file paths, as described above in connection with FIGS. 1A-2.

As further shown in FIG. 4, process 400 may include determining positions of random elements in each file path of the first set of file paths and the second set of file paths (block 450). For example, the access control platform (e.g., using computing resource 224, processor 320, memory 330, and/or the like) may determine positions of random elements in each file path of the first set of file paths and the second set of file paths, as described above in connection with FIGS. 1A-2.

As further shown in FIG. 4, process 400 may include processing the patterns and the positions of the random elements to train a second machine learning model (block 460). For example, the access control platform (e.g., using computing resource 224, processor 320, storage component 340, and/or the like) may process the patterns and the positions of the random elements to train a second machine learning model, as described above in connection with FIGS. 1A-2.

As further shown in FIG. 4, process 400 may include utilizing the second machine learning model to generate a first set of rules to identify files required for execution of the application, and a second set of rules to identify files not required for execution of the application, wherein the second set of rules enable the operating system of the client device to block the files not required for execution of the application (block 470). For example, the access control platform (e.g., using computing resource 224, processor 320, memory 330, and/or the like) may utilize the second machine learning model to generate a first set of rules to identify files required for execution of the application, and a second set of rules to identify files not required for execution of the application, as described above in connection with FIGS. 1A-2. In some implementations, the second set of rules may enable the operating system of the client device to block the files not required for execution of the application.

As further shown in FIG. 4, process 400 may include generating a mandatory access control policy based on the first set of rules and the second set of rules (block 480). For example, the access control platform (e.g., using computing resource 224, processor 320, storage component 340, and/or the like) may generate a mandatory access control policy based on the first set of rules and the second set of rules, as described above in connection with FIGS. 1A-2.

As further shown in FIG. 4, process 400 may include causing the mandatory access control policy to be implemented by the operating system of the client device (block 490). For example, the access control platform (e.g., using computing resource 224, processor 320, memory 330, communication interface 370, and/or the like) may cause the mandatory access control policy to be implemented by the operating system of the client device, as described above in connection with FIGS. 1A-2.

Process 400 may include additional implementations, such as any single implementation or any combination of implementations described below and/or described with regard to any other process described herein.

In some implementations, when receiving the application, the access control platform may receive the application from the client device, or may receive the application from a source device prior to providing the application to the client device.

In some implementations, the application may be received from a source device, and the access control platform may provide the application and the mandatory access control policy to the client device, where the operating system of the client device automatically implements the mandatory access control policy when the client device executes the application.

In some implementations, the files required for execution of the application may include one or more of a read file, a write file, or an execute file. In some implementations, the second machine learning model may include one or more of a naïve Bayes classifier model, a support vector machine model, or a random Forest model.

In some implementations, when causing the mandatory access control policy to be implemented by the operating system of the client device, the access control platform may provide the mandatory access control policy to the client device, where the operating system of the client device automatically implements the mandatory access control policy when the client device executes the application.

In some implementations, the access control platform may receive, from the client device, feedback associated with implementing the mandatory access control policy in the operating system of the client device, and may perform one or more actions based on the feedback.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
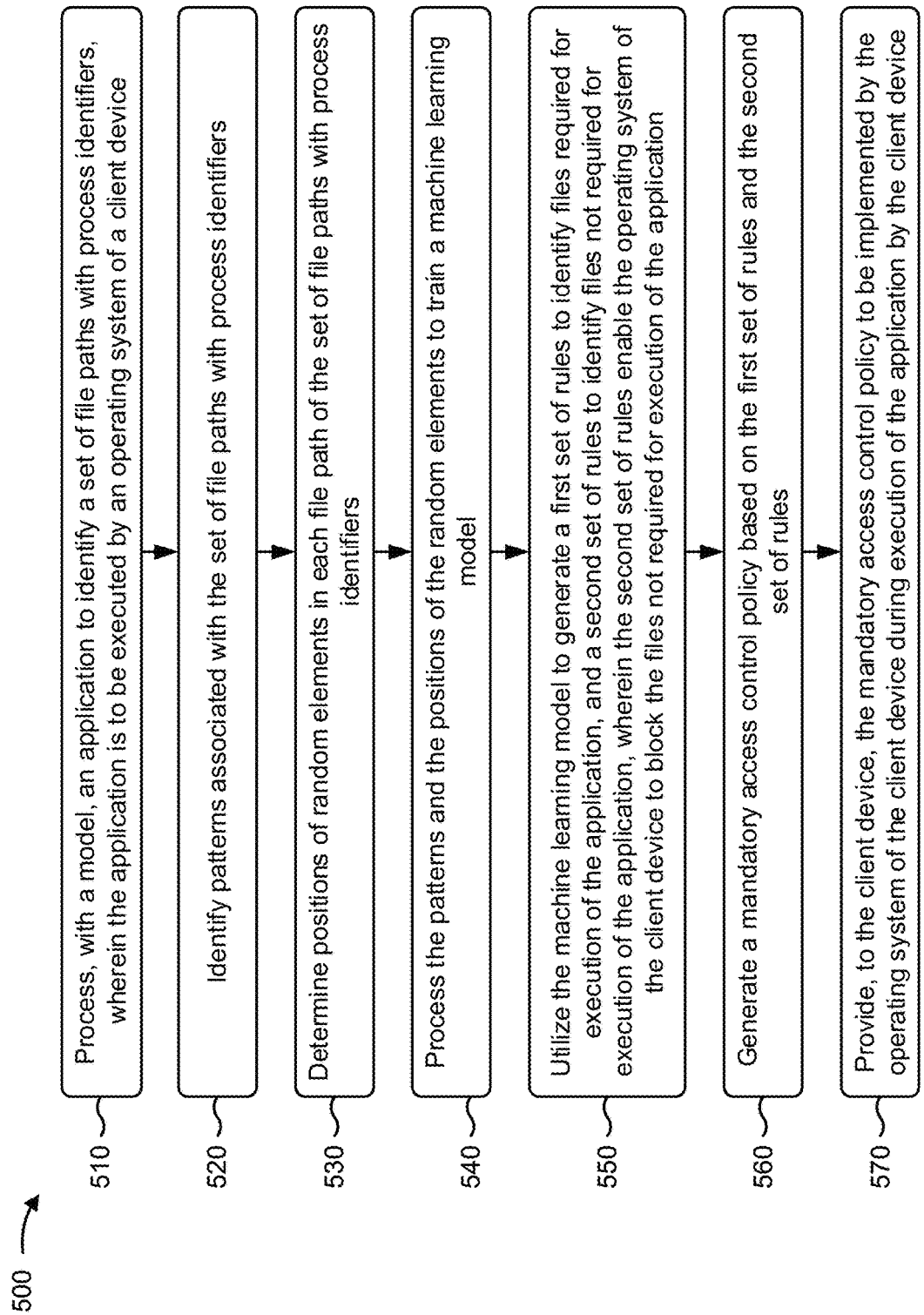

FIG. 5 is a flow chart of an example process 500 for utilizing heuristic and machine learning models to generate a mandatory access control policy for an application. In some implementations, one or more process blocks of FIG. 5 may be performed by an access control platform (e.g., access control platform 220). In some implementations, one or more process blocks of FIG. 5 may be performed by another device or a group of devices separate from or including the access control platform, such as a client device (e.g., client device 210).

As shown in FIG. 5, process 500 may include processing, with a model, an application to identify a set of file paths with process identifiers, wherein the application is to be executed by an operating system of a client device (block 510). For example, the access control platform (e.g., using computing resource 224, processor 320, memory 330, and/or the like) may process, with a model, an application to identify a set of file paths with process identifiers, as described above in connection with FIGS. 1A-2. In some implementations, the application may be executed by an operating system of a client device.

As further shown in FIG. 5, process 500 may include identifying patterns associated with the set of file paths with process identifiers (block 520). For example, the access control platform (e.g., using computing resource 224, processor 320, storage component 340, and/or the like) may identify patterns associated with the set of file paths with process identifiers, as described above in connection with FIGS. 1A-2.

As further shown in FIG. 5, process 500 may include determining positions of random elements in each file path of the set of file paths with process identifiers (block 530). For example, the access control platform (e.g., using computing resource 224, processor 320, memory 330, and/or the like) may determine positions of random elements in each file path of the set of file paths with process identifiers, as described above in connection with FIGS. 1A-2.

As further shown in FIG. 5, process 500 may include processing the patterns and the positions of the random elements to train a machine learning model (block 540). For example, the access control platform (e.g., using computing resource 224, processor 320, memory 330, storage component 340, and/or the like) may process the patterns and the positions of the random elements to train a machine learning model, as described above in connection with FIGS. 1A-2.

As further shown in FIG. 5, process 500 may include utilizing the machine learning model to generate a first set of rules to identify files required for execution of the application, and a second set of rules to identify files not required for execution of the application, wherein the second set of rules enable the operating system of the client device to block the files not required for execution of the application (block 550). For example, the access control platform (e.g., using computing resource 224, processor 320, memory 330, and/or the like) may utilize the machine learning model to generate a first set of rules to identify files required for execution of the application, and a second set of rules to identify files not required for execution of the application, as described above in connection with FIGS. 1A-2. In some implementations, the second set of rules may enable the operating system of the client device to block the files not required for execution of the application.

As further shown in FIG. 5, process 500 may include generating a mandatory access control policy based on the first set of rules and the second set of rules (block 560). For example, the access control platform (e.g., using computing resource 224, processor 320, storage component 340, and/or the like) may generate a mandatory access control policy based on the first set of rules and the second set of rules, as described above in connection with FIGS. 1A-2.

As further shown in FIG. 5, process 500 may include providing, to the client device, the mandatory access control policy to be implemented by the operating system of the client device during execution of the application by the client device (block 570). For example, the access control platform (e.g., using computing resource 224, processor 320, memory 330, communication interface 370, and/or the like) may provide, to the client device, the mandatory access control policy to be implemented by the operating system of the client device during execution of the application by the client device, as described above in connection with FIGS. 1A-2.

Process 500 may include additional implementations, such as any single implementation or any combination of implementations described below and/or described with regard to any other process described herein.

In some implementations, the model may include one or more of a heuristic model, or another machine learning model. In some implementations, the access control platform may receive the application from the client device, or may receive the application from a source device prior to providing the application to the client device.

In some implementations, the application may be received from a source device, and the access control platform may provide the application and the mandatory access control policy to the client device, where the operating system of the client device automatically implements the mandatory access control policy when the client device executes the application In some implementations, the files required for execution of the application may include one or more of a read file, a write file, or an execute file. In some implementations, the machine learning model may include one or more of a naïve Bayes classifier model, a support vector machine model, or a random Forest model.

In some implementations, the access control platform may receive, from the client device, feedback associated with implementing the mandatory access control policy in the operating system of the client device, and may perform one or more actions based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
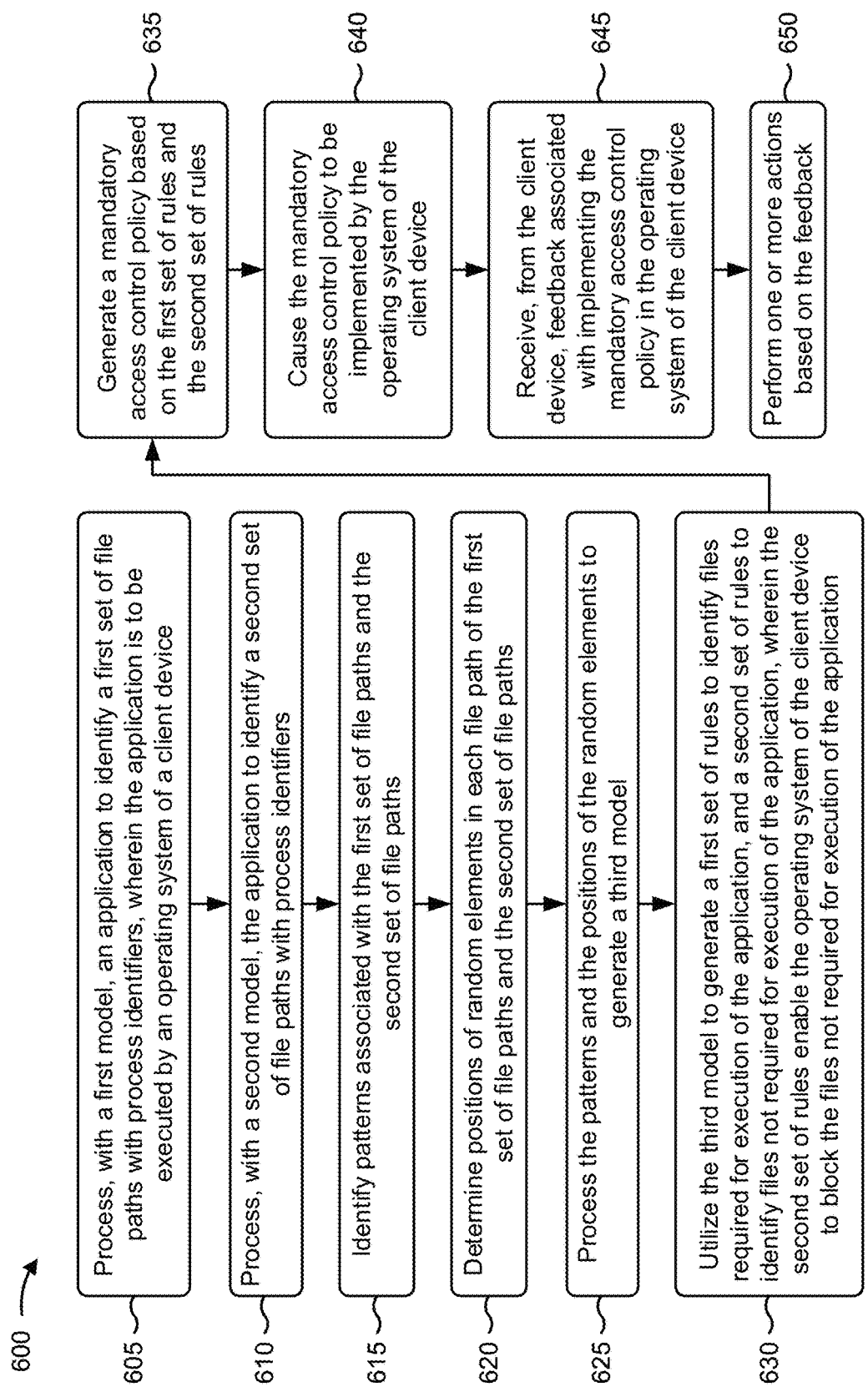

FIG. 6 is a flow chart of an example process 600 for utilizing heuristic and machine learning models to generate a mandatory access control policy for an application. In some implementations, one or more process blocks of FIG. 6 may be performed by an access control platform (e.g., access control platform 220). In some implementations, one or more process blocks of FIG. 6 may be performed by another device or a group of devices separate from or including the access control platform, such as a client device (e.g., client device 210).

As shown in FIG. 6, process 600 may include processing, with a first model, an application to identify a first set of file paths with process identifiers, wherein the application is to be executed by an operating system of a client device (block 605). For example, the access control platform (e.g., using computing resource 224, processor 320, memory 330, and/or the like) may process, with a first model, an application to identify a first set of file paths with process identifiers, as described above in connection with FIGS. 1A-2. In some implementations, the application may be executed by an operating system of a client device.

As further shown in FIG. 6, process 600 may include processing, with a second model, the application to identify a second set of file paths with process identifiers (block 610). For example, the access control platform (e.g., using computing resource 224, processor 320, storage component 340, and/or the like) may process, with a second model, the application to identify a second set of file paths with process identifiers, as described above in connection with FIGS. 1A-2.

As further shown in FIG. 6, process 600 may include identifying patterns associated with the first set of file paths and the second set of file paths (block 615). For example, the access control platform (e.g., using computing resource 224, processor 320, memory 330, storage component 340, and/or the like) may identify patterns associated with the first set of file paths and the second set of file paths, as described above in connection with FIGS. 1A-2.

As further shown in FIG. 6, process 600 may include determining positions of random elements in each file path of the first set of file paths and the second set of file paths (block 620). For example, the access control platform (e.g., using computing resource 224, processor 320, memory 330, and/or the like) may determine positions of random elements in each file path of the first set of file paths and the second set of file paths, as described above in connection with FIGS. 1A-2.

As further shown in FIG. 6, process 600 may include processing the patterns and the positions of the random elements to generate a third model (block 625). For example, the access control platform (e.g., using computing resource 224, processor 320, memory 330, storage component 340, and/or the like) may process the patterns and the positions of the random elements to generate a third model, as described above in connection with FIGS. 1A-2.

As further shown in FIG. 6, process 600 may include utilizing the third model to generate a first set of rules to identify files required for execution of the application, and a second set of rules to identify files not required for execution of the application, wherein the second set of rules enable the operating system of the client device to block the files not required for execution of the application (block 630). For example, the access control platform (e.g., using computing resource 224, processor 320, memory 330, and/or the like) may utilize the third model to generate a first set of rules to identify files required for execution of the application, and a second set of rules to identify files not required for execution of the application, as described above in connection with FIGS. 1A-2. In some implementations, the second set of rules may enable the operating system of the client device to block the files not required for execution of the application.

As further shown in FIG. 6, process 600 may include generating a mandatory access control policy based on the first set of rules and the second set of rules (block 635). For example, the access control platform (e.g., using computing resource 224, processor 320, storage component 340, and/or the like) may generate a mandatory access control policy based on the first set of rules and the second set of rules, as described above in connection with FIGS. 1A-2.

As further shown in FIG. 6, process 600 may include causing the mandatory access control policy to be implemented by the operating system of the client device (block 640). For example, the access control platform (e.g., using computing resource 224, processor 320, storage component 340, communication interface 370, and/or the like) may cause the mandatory access control policy to be implemented by the operating system of the client device, as described above in connection with FIGS. 1A-2.

As further shown in FIG. 6, process 600 may include receiving, from the client device, feedback associated with implementing the mandatory access control policy in the operating system of the client device (block 645). For example, the access control platform (e.g., using computing resource 224, processor 320, communication interface 370, and/or the like) may receive, from the client device, feedback associated with implementing the mandatory access control policy in the operating system of the client device, as described above in connection with FIGS. 1A-2.

As further shown in FIG. 6, process 600 may include performing one or more actions based on the feedback (block 650). For example, the access control platform (e.g., using computing resource 224, processor 320, communication interface 370, and/or the like) may perform one or more actions based on the feedback, as described above in connection with FIGS. 1A-2.

Process 600 may include additional implementations, such as any single implementation or any combination of implementations described below and/or described with regard to any other process described herein.

In some implementations, the access control platform may receive the application from the client device, or may receive the application from a source device prior to providing the application to the client device. In some implementations, the access control platform may provide the application and the mandatory access control policy to the client device, where the operating system of the client device automatically implements the mandatory access control policy when the client device executes the application.

In some implementations, the files required for execution of the application may include one or more of a read file, a write file, or an execute file. In some implementations, the third model may include one or more of a naïve Bayes classifier model, a support vector machine model, or a random Forest model.

In some implementations, when causing the mandatory access control policy to be implemented by the operating system of the client device, the access control platform may provide the mandatory access control policy to the client device, where the operating system of the client device automatically implements the mandatory access control policy when the client device executes the application.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, an application to be executed by an operating system of a client device;
    processing, by the device and with a heuristic model, the application to identify a first set of file paths with process identifiers;
    processing, by the device and with a first machine learning model, the application to identify a second set of file paths with process identifiers;
    identifying, by the device, patterns associated with the first set of file paths and the second set of file paths;
    determining, by the device, positions of random elements in each file path of the first set of file paths and the second set of file paths;
    processing, by the device, the patterns and the positions of the random elements to train a second machine learning model;
    utilizing, by the device, the second machine learning model to generate:
        a first set of rules to identify files required for execution of the application, and
        a second set of rules to identify files not required for execution of the application,
            wherein the second set of rules enable the operating system of the client device to block the files not required for execution of the application;
    generating, by the device, a mandatory access control policy based on the first set of rules and the second set of rules;
    causing, by the device, the mandatory access control policy to be implemented by the operating system of the client device;
    receiving, by the device and from the client device, feedback associated with implementing the mandatory access control policy in the operating system of the client device; and
    performing, by the device, one or more actions based on the feedback.

2. The method of claim 1, wherein receiving the application comprises one of:
    receiving the application from the client device; or
    receiving the application from a source device prior to providing the application to the client device.

3. The method of claim 1, wherein the application is received from a source device, and the method further comprises:
    providing the application and the mandatory access control policy to the client device,
        wherein the operating system of the client device automatically implements the mandatory access control policy when the client device executes the application.

4. The method of claim 1, wherein the files required for execution of the application include one or more of:
    a read file, a write file, or an execute file.

5. The method of claim 1, wherein the second machine learning model includes one or more of:

a naïve Bayes classifier model, a support vector machine model, or a random Forest model.

6. The method of claim 1, wherein causing the mandatory access control policy to be implemented by the operating system of the client device includes:

providing the mandatory access control policy to the client device, wherein the operating system of the client device automatically implements the mandatory access control policy when the client device executes the application.

7. The method of claim 1, wherein the feedback includes information indicating whether the application operated correctly.

8. A device, comprising:

one or more memories; and one or more processors, communicatively coupled to the one or more memories, to:

process, with a model, an application to identify a set of file paths with process identifiers, wherein the application is to be executed by an operating system of a client device;

identify patterns associated with the set of file paths with process identifiers;

determine positions of random elements in each file path of the set of file paths with process identifiers;

process the patterns and the positions of the random elements to train a machine learning model;

utilize the machine learning model to generate:

a first set of rules to identify files required for execution of the application, and a second set of rules to identify files not required for execution of the application, wherein the second set of rules enable the operating system of the client device to block the files not required for execution of the application;

generate a mandatory access control policy based on the first set of rules and the second set of rules;

provide, to the client device, the mandatory access control policy to be implemented by the operating system of the client device during execution of the application by the client device;

receive, from the client device, feedback associated with implementing the mandatory access control policy in the operating system of the client device; and perform one or more actions based on the feedback.

9. The device of claim 8, wherein the model includes one or more of:

a heuristic model, or another machine learning model.

10. The device of claim 8, wherein the one or more processors are further to one of:

receive the application from the client device; or receive the application from a source device prior to providing the application to the client device.

11. The device of claim 8, wherein the application is received from a source device, and the one or more processors are further to:

provide the application and the mandatory access control policy to the client device, wherein the operating system of the client device automatically implements the mandatory access control policy when the client device executes the application.

12. The device of claim 8, wherein the files required for execution of the application include one or more of:

a read file, a write file, or an execute file.

13. The device of claim 8, wherein the machine learning model includes one or more of:

a naïve Bayes classifier model, a support vector machine model, or a random Forest model.

14. The device of claim 8, wherein the feedback includes information indicating whether the application operated correctly.

15. A non-transitory computer-readable medium storing instructions, the instructions comprising:

one or more instructions that, when executed by one or more processors of a device, cause the one or more processors to:

process, with a first model, an application to identify a first set of file paths with process identifiers, wherein the application is to be executed by an operating system of a client device;

process, with a second model, the application to identify a second set of file paths with process identifiers;

identify patterns associated with the first set of file paths and the second set of file paths;

determine positions of random elements in each file path of the first set of file paths and the second set of file paths;

process the patterns and the positions of the random elements to generate a third model;

utilize the third model to generate:

a first set of rules to identify files required for execution of the application, and a second set of rules to identify files not required for execution of the application, wherein the second set of rules enable the operating system of the client device to block the files not required for execution of the application;

generate a mandatory access control policy based on the first set of rules and the second set of rules;

cause the mandatory access control policy to be implemented by the operating system of the client device;

receive, from the client device, feedback associated with implementing the mandatory access control policy in the operating system of the client device; and perform one or more actions based on the feedback.

16. The non-transitory computer-readable medium of claim 15, wherein the instructions further comprise:

one or more instructions that, when executed by the one or more processors, cause the one or more processors to one of:

receive the application from the client device; or receive the application from a source device prior to providing the application to the client device.

17. The non-transitory computer-readable medium of claim 15, wherein the instructions further comprise:

one or more instructions that, when executed by the one or more processors, cause the one or more processors to:

provide the application and the mandatory control policy to the client device,
wherein the operating system of the client device automatically implements the mandatory access control policy when the client device executes the application.

18. The non-transitory computer-readable medium of claim 15, wherein the files required for execution of the application include one or more of:
a read file,
a write file, or
an execute file.

19. The non-transitory computer-readable medium of claim 15, wherein the third model includes one or more of:
a naïve Bayes classifier model,
a support vector machine model, or
a random Forest model.

20. The non-transitory computer-readable medium of claim 15, wherein the one or more instructions, that cause the one or more processors to cause the mandatory access control policy to be implemented by the operating system of the client device, cause the one or more processors to:
provide the mandatory access control policy to the client device,
wherein the operating system of the client device automatically implements the mandatory access control policy when the client device executes the application.

* * * * *